Figure 1:
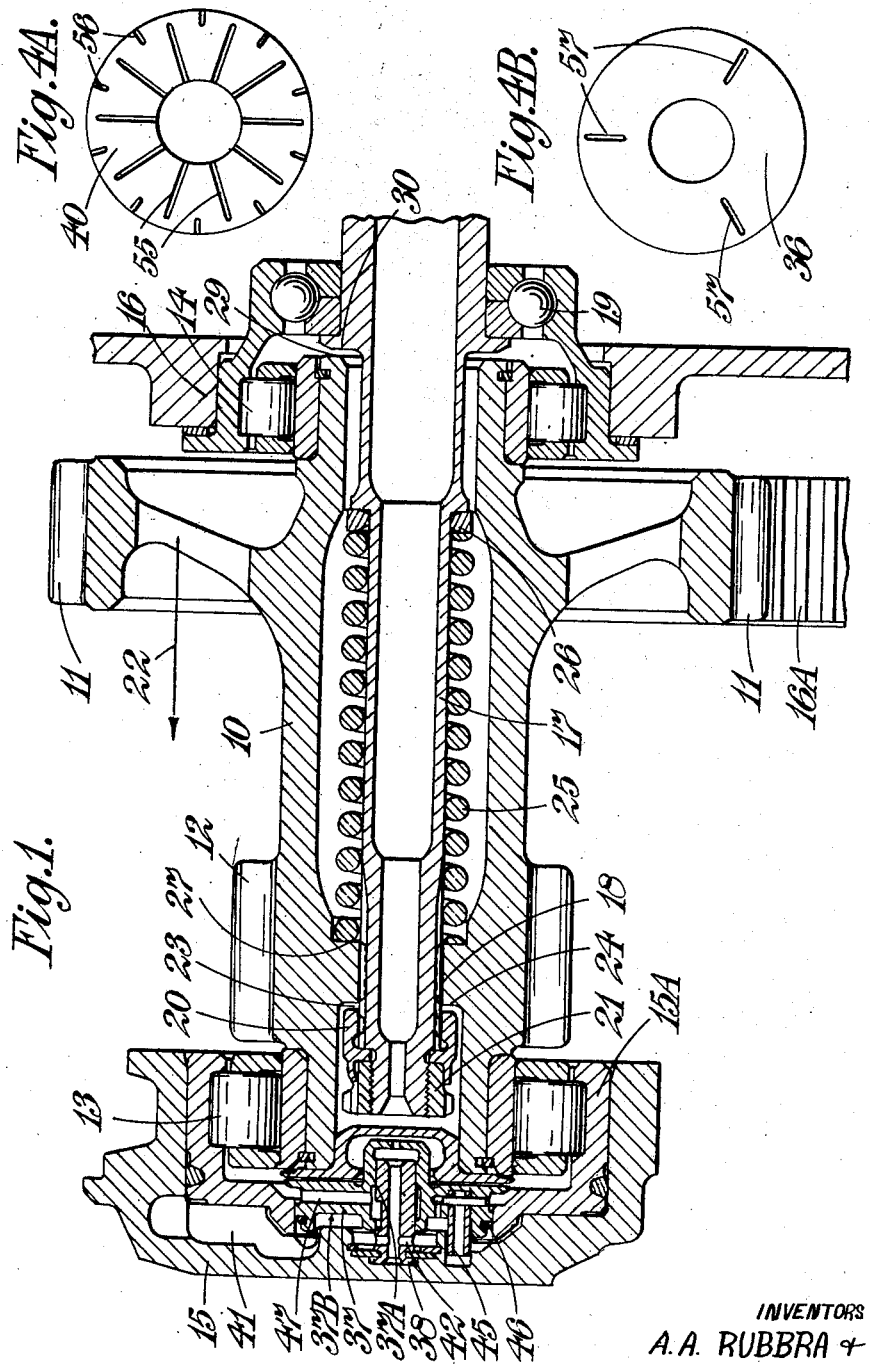

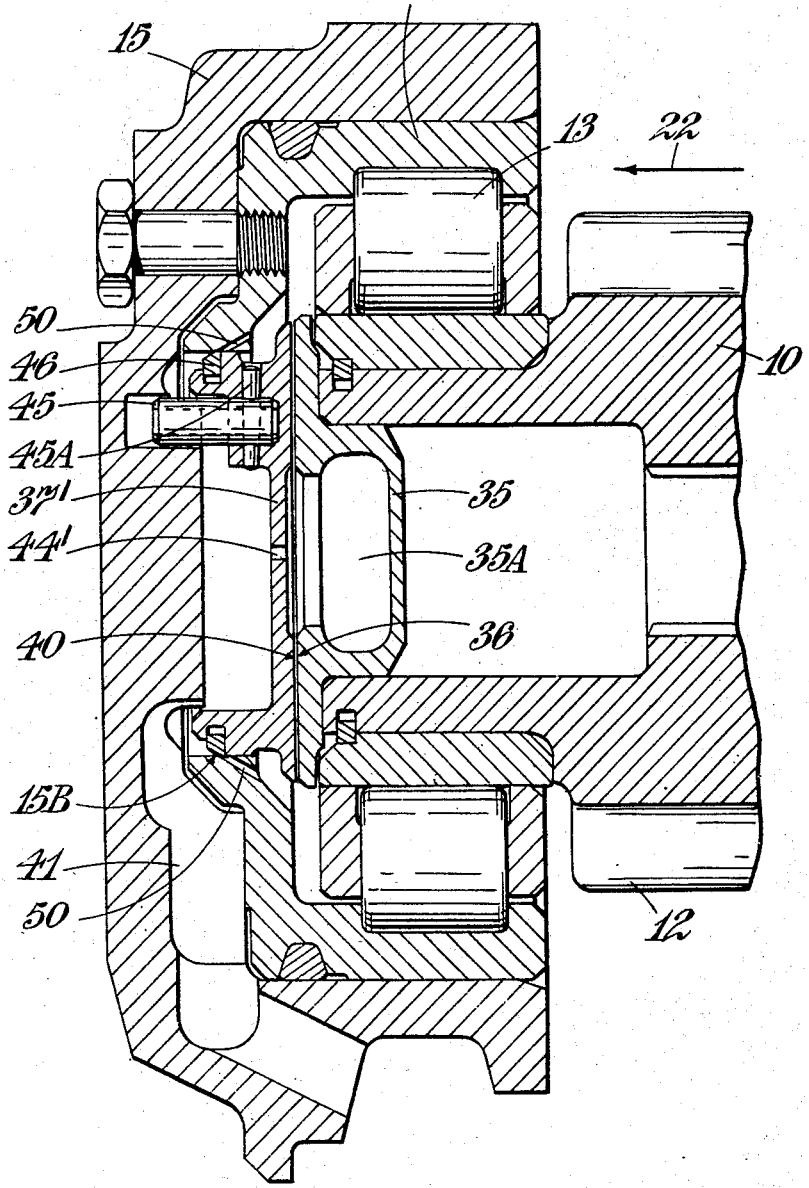

Patented Nov. 17, 1953

2,659,240

UNITED STATES PATENT OFFICE 2,659,240

HYDRAULIC THRUST BALANCING DEVICE

Arthur Alexander Rubbra and Lionel Haworth, Littleover, Derby, England, assignors to Rolls-Royce Limited, Derby, England, a British company Application September 4, 1951, Serial No. 245,052

Claims priority, application Great Britain September 6, 1950

12 Claims. (Cl. 74—410)

1

This invention relates to shaft thrust-balancing devices of the type (hereafter referred to as the kind specified) in which an axial thrust-balancing load is applied to the shaft by means of a hydraulic piston arrangement.

One important (though not exclusive) application of the invention is in thrust-balancing devices of the kind specified which are used for the purpose of applying a thrust-balancing load on an end of a shaft carrying a helical-toothed gear which generates an axial thrust proportional to the torque loading and in which the hydraulic pressure is measured for the purpose giving an indication of the torque being transmitted by the shaft.

According to one aspect of the present invention there is provided a shaft-balancing device of the kind specified in gear mechanism, including a gear of the type giving rise to axial load on the shaft when torque is transmitted through the gear mechanism, wherein the shaft is borne for rotation in stationary structure to have a degree of axial freedom relative thereto, and wherein there is provided a piston element having an axially-facing surface co-operating with a complementary surface on said shaft, the piston element being mounted in a cylinder to which a supply of pressure liquid is made to load said axially facing surfaces together and said surfaces being lubricated by a liquid under pressure.

According to another aspect of the present invention, a shaft thrust-balancing device of the kind specified comprises the combination with stationary structure and a shaft which is borne for rotation in the stationary structure and has a limited axial freedom with respect to the stationary structure, of a piston element having an axially-facing surface co-operating with an axially-facing surface on said shaft, said piston element being slidably accommodated in a cylinder provided in said stationary structure, port means to admit a supply of a pressure liquid to the cylinder on one side of said piston element to load said axially-facing surfaces into engagement, means to control the pressure of the pressure liquid including outlet control ports from said cylinder on said one side of said piston element arranged to be covered to an extent which is varied on axial movement of said piston element in the cylinder thereby to vary their effective area, and means to permit a flow of liquid under pressure to between said axially-facing surfaces to lubricate them.

In arrangements according to the invention the liquid under pressure for lubricating the axially facing surfaces is preferably derived from the supply of pressure liquid to the cylinder, conveniently through a restrictor preventing flow of liquid from the said one side of the piston element to the other side thereof.

In one embodiment of the invention the piston element is formed with a central boss which slides on a spigot mounted in the stationary structure, and the control ports are formed by recesses in the spigot, which recesses are arranged to be covered by the central boss to an extent dependent on the axial movement of the piston element. The spigot may also have an axial bore leading to a chamber in the piston boss which chamber has an outlet in the form of a restricted orifice leading to the inner edges of the axially-facing surfaces.

In another embodiment of this invention, the control ports are formed in the cylinder in which the piston element slides, and the effective area of the ports is varied by their being covered to a variable extent by a piston ring carried by the piston element. The piston ring is conveniently of substantial axial thickness to have a robust construction and is preferably chamfered to have a small area of contact with the cylinder. In this construction a restrictor is conveniently afforded by a restricted orifice in the piston element affording communication from said one side of the piston to the radially inner edges of said axially-facing surfaces.

In both these embodiments it is preferred to restrain rotation of the piston element under the influence of the torque transmitted between the axially-facing surfaces, and for this purpose restraining means may be provided comprising an axially-directed peg carried by the piston element and engaging an axial bore in the stationary structure.

According to a feature of the invention, there may be provided a thrust bearing for the shaft which is normally inoperative and which is arranged to become operative to accommodate thrust loading on the shaft on a predetermined axial movement of the shaft in the direction of action of the thrust load to be balanced by the hydraulic-pressure load between the axially-facing surfaces. Such a thrust bearing will normally permit the shaft to continue to run if the balancing load due to the hydraulic piston arrangement fails, say when the pressure liquid supply to said one side of the piston element fails.

In one embodiment of this feature of the invention, the thrust bearing supports and axially locates a second shaft which is nested within the shaft which is axially free in the stationary structure, said shafts having co-operating axial splines so that the shafts rotate together, and there is provided axially-facing abutments on said shafts which abutments come into engagement after a limited axial movement of said axially-free shaft with respect to said second shaft under the action of the thrust load to be balanced through said piston element, whereby said thrust load is transmitted through said second shaft to said thrust bearing. The shafts may also be provided with a further set of abutments to limit relative axial movement between the shafts in a direction opposite to that caused by the thrust load to be balanced.

According to yet another feature of this invention, there may be provided resilient means to load said shaft in the direction of action of the thrust load to be balanced. For instance in a construction as above set forth having the nested shafts the spring may encircle the second shaft and have abutments on each of the shafts. With this biassing arrangement if the pressure of the pressure liquid on said one side of the piston is employed to give an indication of the torque being transmitted by the shaft, a positive pressure will be indicated under zero torque conditions.

The co-operating axially-facing surfaces on the piston element and shaft may be plane surfaces, and one or both of these surfaces may be formed with suitable radial cutaway portions or grooves to permit a controlled leakage between the surfaces.

Figure 2:
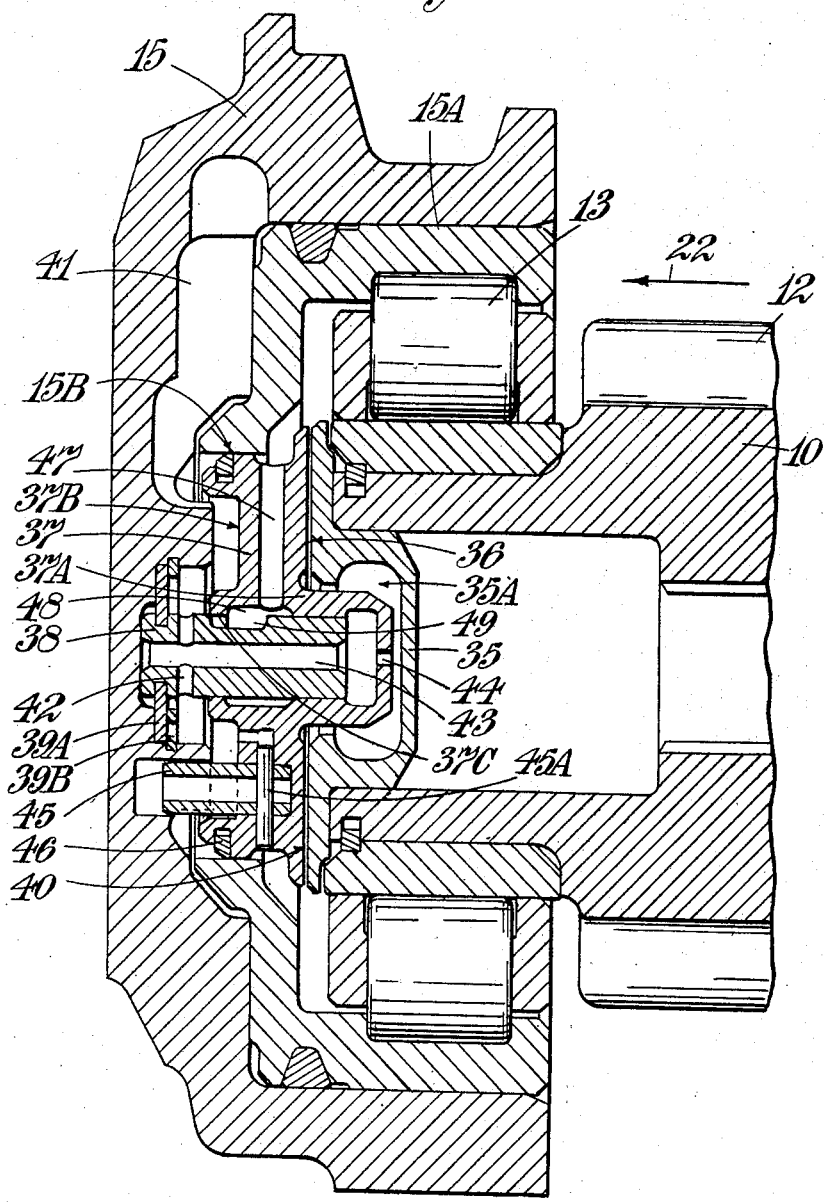

Some constructional embodiments of the invention will now be described with reference to the accompanying drawings, in which:

Figure 1 illustrates in axial section a layshaft of an aero-engine reduction gear to which is fitted a shaft thrust balancing device, Figure 2 is an enlarged view of the left-hand end of Figure 1, Figure 3 illustrates a modification of the arrangement shown in Figure 2; and Figures 4A and 4B are detail views illustrating a preferred arrangement of grooving on axially-facing surfaces of adjacent parts of the arrangements.

Referring to Figure 1, the layshaft is indicated at 10 and comprises a helical-toothed gear 11 and a straight-toothed spur gear 12. The gear 11 in use will mesh with a complementary helical-toothed pinion 16A which is axially located in the reduction gear housing parts of which are indicated at 15 and 16.

The layshaft 10 is borne by roller journal bearings 13 and 14 arranged respectively in the parts 15, 16 of the reduction gear housing, and the layshaft 10 is thus free for axial movement as described in greater detail below. The layshaft 10 is hollow and accommodates a quill shaft 17 which engages splines 18 formed internally of the layshaft 10 and which is borne by a journal/thrust bearing 19 in the part 16 of the stationary structure of the reduction gear housing. The quill shaft 17 additionally has an abutment sleeve 20 secured to it on its forward end by a nut 21.

It will be appreciated that during transmission of a torque through the helical-toothed gear 11, an axial load will be developed on layshaft 10 which axial load, in normal operation of the arrangement illustrated, acts and tends to move the layshaft 10 in the "forward" direction as indicated by arrow 22. During negative torque transmission (that is transmission of a torque from a normally-driven member to a normally-driving member) through the helical-toothed gear 11, an axial load will be developed which acts and tends to move layshaft 10 in a "reverse" direction which is opposite to that indicated by the arrow 22. Movement of the layshaft in the direction of arrow 22 is limited by the axial extent of the clearance 23 between the abutment sleeve 21 and an inwardly extending shoulder abutment 24 in the hollow layshaft 10. Thus, if the thrust load on the layshaft 10 is not hydraulically balanced in the manner which will be described hereinafter, the thrust loading is accommodated by being transmitted through the shoulder 24, abutment sleeve 22 and the quill shaft 17 to the bearing 19. This feature of the invention ensures that the reduction gear does not fail in the event of failure of the hydraulic balancing arrangement, the bearing 19 being designed to be capable of continued running under the maximum axial load normally experienced. However, when the hydraulic balancing arrangement is operative, the journal bearing/thrust bearing 19 is only lightly loaded by the quill shaft 17.

A spring 25 surrounds the quill shaft 17 and has one abutment against a collar 26 on the shaft 17 and has its second abutment against a shoulder 27 on the layshaft 10, whereby the spring 25 biasses the layshaft 10 in the direction of the arrow 22. This spring bias is thus in the same direction as an axial load produced by the helical-toothed gear 11 when it transmits positive torque, so that a positive hydraulic pressure will be required under the condition of no-torque transmission through the helical-toothed gear 11 to balance the spring loading. Additionally a positive hydraulic pressure of a lesser value will exist under conditions of reverse torque up to a value of the latter depending on the loading of the spring.

The layshaft 10 of the arrangement of Figure 1 is formed with an abutment 29 which co-operates with abutment shoulder 30 on quill shaft 17 to limit the "reverse" movement of the layshaft 10 under negative torque conditions.

Turning now to the hydraulic balancing arrangement illustrated in Figure 1 and in greater detail in Figure 2, it will be seen that the hollow forward end of the shaft 10 is plugged by a plug element 35 having a radially-extending flange providing an axially-facing surface 36. The part 15 of the stationary structure of the reduction gear includes element 15A providing the outer race of the roller bearing 13 and also a cylinder 15B accommodating a piston element 37. The latter has a boss portion 37A which is hollow and is slidably mounted on a spigot 38. The spigot 38 is retained in the part 15 of the stationary structure of the reduction gearing by a split ring 39A which engages a peripheral groove in the spigot 38 and is received in a recess in the part 15, and by a circlip 39B which bears against the split ring 39A and engages in a groove in the wall of the recess. This split ring and circlip permits a limited universal movement of the spigot 38 in the part 15 of stationary structure to accommodate any lack of coaxiality of the parts and thus to prevent binding of the piston element 37 in the cylinder 15B. The piston element 37 has an axially-facing surface 40 co-operating with the axially-facing surface 36.

A hydraulic fluid supply duct 41 conveys a pressure liquid to the space on the forward side 37B of the piston element 37, and this space communicates with the rear side of the piston element through ports 42 in the spigot leading to an axial bore 43 in the spigot 38, and through a restricted orifice 44 in the boss portion 37A of the piston element 37 leading from axial bore 43 to a chamber 35A in the plug element 35. Any pressure liquid which flows into the chamber 35A leaks away from the chamber between the axially-facing co-operating surfaces 36 and 40 towards the bearing 13 and thus to drain. In this manner, the surfaces 36, 40 are efficiently lubricated as a thrust bearing.

Rotation of the piston element 37 in its cylinder 15B is prevented by a peg 45 which is retained in position in the piston element 37 by taper pin 45A, and engages in a bore 45B in part 15 of the stationary structure of the reduction gear.

The piston element 37 carries a piston ring 46 which provided a fluid seal between the opposite faces of the piston element 37 and which is preferably chamfered in the manner indicated to provide a reduced contact area with the cylinder 15B. It has been found that this chamfering reduces the hydraulic load with which the piston ring 46 bears against the wall of cylinder 15B, thereby permitting a reduced frictional load between the ring 46 and the wall of the cylinder 15B to be attained whilst employing a robust construction of piston ring.

The piston element 37 is formed with a number of radially extending ports 47 which communicate at their inner ends with an annular recess 48 in the boss portion 37A of the piston element. The latter has a lip 37C which co-operates with a number of recess formations, say three recesses such as the one shown at 49, formed in the external surface of the spigot 38 in a manner to afford variable-area ports through which pressure fluid can pass from the forward side 37B of the piston element 37 into the recesses 49 and thence through the radial ports 47 towards bearing 13 and thus to drain. The area of the variable-area ports is determined by the axial position of the piston element 37 on the spigot 38 and thus of the lip 37C with respect to the recesses 49 and this area controls the hydraulic pressure applied to the piston element on its face 37B which pressure produces an axial load on the piston element 37 which is transmitted across the co-operating surfaces 36 and 40 to balance the thrust on the layshaft 10.

Movement of the layshaft 10 in the direction of the arrow 22 tends to close-off the variable-area ports and thus increases the hydraulic pressure applied to the piston element 37, and movement in the opposite direction increases the port area and reduces the hydraulic pressure applied to the piston element 37.

Turning now to Figure 3, an alternative arrangement is illustrated, in the description of which like numerals are used to indicate parts corresponding with those illustrated in Figures 1 and 2. In this construction the spigot 38 and boss portion 37A of the piston are omitted and the hydraulic control porting is afforded by the piston ring 46 in co-operation with a number of circumferentially disposed leakage ports 50 formed in the cylinder wall 15B. The piston element 37' has a centrally-arranged restricted orifice 44' equivalent to the orifice 44 of the construction illustrated in Figures 1 and 2. This balancing arrangement thus functions in a manner similar to that previously described.

Referring now to Figures 4A and 4B, there is illustrated a typical arrangement of grooving desirable in the co-operating surfaces 40 and 36 to permit a controlled leakage between the surfaces and thus to ensure adequate lubrication of the surfaces and to prevent overheating of the lubricant. In Figure 4A, the surface 40 is shown as having a number of grooves 55 extending radially from its inner edge to close to the outer edge and angularly staggered grooves 56 extending radially inwards from outer edge to about the radius of the outer ends of the grooves 55. The co-operating surface 36 is illustrated in Figure 4B and this surface has, say, three radial grooves 57 which do not reach the edges of the surface and radially just overlap the inner ends of grooves 56 and the other ends of grooves 55. When the surfaces rotate relative to one another, the grooves 57 are filled with liquid from grooves 55 and are emptied through grooves 56. It will be appreciated that alternative arrangements can be used in order to obtain adequate lubrication of the surfaces which in effect form a thrust bearing, the thrust on the shaft being transmitted through the oil film to the piston element.

In a reduction gear having a number of layshafts, each layshaft may have a thrust-balancing device of the kind specified, and the devices may be fed in parallel with pressure liquid from a common source; normally in such an arrangement one only (the master) of the thrust-balancing devices need be provided with control ports 50 or recesses 49 as in the arrangements of Figure 3 and Figure 2 respectively, the pressure of the liquid acting on the piston element of the remaining devices being controlled from the master thrust-balancing device. To provide a slave thrust-balancing device the ports 50 may be omitted from the construction of Figure 3. Thus, for example, in a reduction gear having three layshafts, a single master thrust-balancing arrangement, for instance an arrangement as illustrated in Figures 1 and 2, can be used on one layshaft, and thrust-balancing arrangements illustrated in Figure 3 with ports 50 omitted may be used on the other two shafts, the chambers 41 of all three devices being interconnected.

With constructions of thrust-balancing device above described not only is the liquid pressure controlled in a simple manner and the abutting surfaces of the shaft and piston-element properly lubricated, but also, by incorporating other improved features, the shaft will continue to run even though the hydraulic thrust-balancing means fails since the thrust on the shaft will be taken up by the thrust bearing 19, which also takes up reverse thrust. Moreover the provision of the biasing spring 17 requires that a positive hydraulic pressure be applied to the piston element under zero torque conditions.

Further, in an arrangement comprising a plurality of shafts with associated thrust-balancing devices as above set forth interconnected to operate at equal liquid pressure; substantially equal torques will be transmitted through the shafts.

The hydraulic pressure of the pressure liquid acting on the piston element may be measured on an appropriately calibrated scale to give an indication of the torque being transmitted.

We claim:

1. A shaft thrust-balancing device of the kind specified comprising in combination a stationary structure having a cylinder provided in it, a shaft having an axially facing surface on it, which shaft has an axial load on it in normal operation, bearing means in said stationary structure and supporting said shaft with limited axial freedom with respect to said stationary structure, a piston element slidably accommodated in said cylinder and having an axial facing surface on it co-operating with said axial facing surface on said shaft, pressure liquid supply means to said cylinder on the one side of said piston element remote from said axial facing surface to supply liquid under pressure to load said co-operating axial facing surfaces together, an outlet port from said cylinder on said one side of said piston element, co-operating valve means to co-operate with said port to vary the area thereof, said co-operating valve means being connected to move with said piston element whereby the area of said port is adjusted to be dependent on the position of said piston element in said cylinder, and lubricant supply means to supply liquid under pressure between said axially facing surfaces said lubricant supply means comprising a second outlet port from said cylinder on said one side of said piston and a duct leading from said second outlet port to between said axially facing surfaces.

2. A shaft thrust-balancing device of the kind specified comprising in combination a stationary structure having a cylinder provided in it, a shaft having an axial facing surface on it, which shaft has an axial load on it in operation, bearing means in said stationary structure and supporting said shaft with limited axial freedom with respect to said stationary structure, a spigot supported in said stationary structure in said cylinder and coaxial with said shaft, a piston element slidably accommodated in said cylinder and having an axial facing surface on it co-operating with said axial facing surface on said shaft, a boss on said piston element having an axial bore receiving said spigot in sliding engagement, pressure liquid supply means to said cylinder on one side of said piston element to supply liquid under pressure to load said co-operating axially facing surfaces into engagement, an outlet port from said cylinder on said one side of said piston element formed in said spigot and located so that its area is varied by said boss on movement of said piston element, and lubricant supply means to supply liquid under pressure between said axial facing surfaces said lubricant supply means comprising a second outlet port from said cylinder on said one side of said piston and a duct leading from said second outlet port to between said axially facing surfaces.

3. A shaft thrust-balancing device as claimed in claim 2 wherein said spigot is formed with a circumferential groove adjacent said stationary structure, and said stationary structure is formed with a recess co-axial with and surrounding said groove, said device further comprising a split ring which has its inner edge in said groove and its outer edge in said recess, and a circlip in said recess to retain said split ring in position in said recess whereby said spigot is supported in said stationary structure in a manner permitting misalignment of the parts.

4. A shaft thrust-balancing device of the kind specified comprising in combination a stationary structure having a cylinder provided in it and a bore extending eccentrically from the end of said cylinder, a shaft having an axially facing surface on it, which shaft has an axial load on it in normal operation, bearing means in said stationary structure and supporting said shaft with limited axial freedom with respect to said stationary structure, a piston element slidably accommodated in said cylinder and having an axially facing surface on it co-operating with said axial facing surface on said shaft, a peg carried by said piston element and engaged in said bore for axial sliding movement, pressure liquid supply means to said cylinder on one side of said piston element remote from said axially facing surface to supply liquid under pressure to load said co-operating axially facing surfaces together, an outlet port from said cylinder on said one side of said piston element, co-operating valve means to co-operate with said port to vary the area thereof, said co-operating valve means being connected to move with said piston element whereby the area of said port is adjusted to be dependent on the position of said piston element in said cylinder, and lubricant supply means to supply liquid under pressure between said axially facing surfaces said lubricant supply means comprising a second outlet port from said cylinder on said one side of said piston and a duct leading from said second outlet port to between said axially facing surfaces.

5. A shaft thrust-balancing device of the kind specified comprising in combination a stationary structure having a cylinder provided in it, a hollow shaft having an axial facing surface on it, which shaft has an axial load on it in normal operation, bearing means in said stationary structure and supporting said shaft with limited axial freedom with respect to said stationary structure, a piston element slidably accommodated in said cylinder and having an axial facing surface on it co-operating with said axial facing surface on said shaft, pressure liquid supply means to said cylinder on one side of said piston element remote from said axial facing surface to supply liquid under pressure to load said co-operating axial facing surfaces together, an outlet port from said cylinder on said one side of said piston element, co-operating valve means to co-operate with said port to vary the area thereof, said co-operating valve means being connected to move with said piston element, whereby the area of said port is adjusted to be dependent on the position of said piston element in said cylinder, lubricant supply means to supply liquid under pressure between said axially facing surfaces said lubricant supply means comprising a second outlet port from said cylinder on said one side of said piston and a duct leading from said second outlet port to between said axially facing surfaces, thrust bearing means in said stationary structure, a second shaft supported by, and axially located by, said thrust bearing means which second shaft extends within said hollow shaft, a first axially facing abutment on said hollow shaft, a second axially facing abutment on said second shaft adjacent said first abutment said first and second abutments being arranged to co-operate in the event of failure of said pressure liquid supply means to supply liquid under pressure to said cylinder during normal operation whereby the axial load on said hollow shaft is transmitted to said thrust bearing means in the event of such failure.

6. A shaft thrust-balancing device as claimed in claim 5 wherein said hollow shaft has an axial load on it in normal operation and a reverse axial load on it during reverse operation, said shaft thrust balancing device further comprising a third axial facing abutment on said hollow shaft and a fourth axial facing abutment on said second shaft adjacent said third abutment, said third and fourth abutments being arranged to co-operate during reverse operation to transmit said reverse axial load to said thrust bearing means.

7. A shaft thrust-balancing device as claimed in claim 5 further comprising first spring abutment means on said hollow shaft, second spring abutment means on said second shaft and a spring between said two spring abutment means, said spring being prestressed to load said hollow shaft in the same direction as said axial load.

8. A shaft thrust-balancing device of the kind specified comprising in combination a stationary structure having a cylinder provided in it, a shaft having an axial facing surface on it which shaft has an axial load on it during normal operation, bearing means in said stationary structure and supporting said shaft with limited axial freedom with respect to said stationary structure, a piston element slidably engaged in said cylinder and having an axial facing surface on it co-operating with said axial facing surface on said shaft, pressure liquid supply means to said cylinder on the side of said piston element remote from said axial facing surface to supply liquid under pressure to load said co-operating axial facing surfaces together, an outlet port from said cylinder on said one side of said piston element, co-operating valve means to co-operate with said port to vary the area thereof, said co-operating valve means being connected to move with said piston element whereby the area of said port is adjusted to be dependent on the position of said piston element in said cylinder, lubricant supply means to supply liquid under pressure between said axial facing surfaces said lubricant supply means comprising a second outlet port from said cylinder on said one side of said piston and a duct leading from said second outlet port to between said axially facing surfaces and resilient means prestressed to load said shaft in the same direction as said axial load.

9. A shaft thrust-balancing device of the kind specified comprising in combination a stationary structure having a cylinder provided in it, a shaft having an axially facing surface on it, which shaft has an axial load on it during normal operation, bearing means in said structure and supporting said shaft with limited axial freedom with respect to said stationary structure, a piston element slidably accommodated in said cylinder and having an axially facing surface on it co-operating with said axially facing surface on said shaft, a piston ring on said piston element, pressure liquid supply means to said cylinder on the side of said piston element remote from said axially facing surface, an outlet port in the wall of said cylinder adjacent said piston ring so that the area of said outlet port is varied on movement of said piston element in said cylinder, and lubricant supply means to supply liquid under pressure between said axially facing surfaces said lubricant supply means comprising a second outlet port from said cylinder on said one side of said piston and a duct leading from said second outlet port to between said axially facing surfaces.

10. A shaft thrust-balancing device as claimed in claim 9, wherein said piston ring has a substantial axial thickness at its inner diameter and is chamfered to have smaller axial thickness at its outer diameter.

11. A shaft thrust-balancing device as claimed in claim 9 wherein said lubricant supply means comprises an orifice in said piston element leading from one side of said piston element to the other, said orifice constituting said second outlet duct.

12. A shaft thrust-balancing device of the kind specified, comprising in combination a stationary structure having a cylinder provided in it, and an eccentrically located axial socket in the end wall of said cylinder, a hollow shaft, a cup closing one end of said shaft to provide an open ended bore in said end of said shaft the flange of said cup providing an axially facing surface at said end of said shaft which axially facing surface has a first set of radial grooves in it which terminate short of its inner and outer edges, said shaft having an axial load on it towards said cup during normal operation, bearing means in said stationary structure and supporting said shaft with limited axial freedom with respect to said stationary structure, a piston element slidably accommodated in said cylinder and having an axially facing surface on it co-operating with said axially facing surface provided by said flange, said axially facing surface on said piston element having a second set of radially extending grooves in it extending outwardly from its inner edge towards, but short of, its outer edge for such distance that they overlap said first set of grooves during relative rotation of said piston element and said flange, said axially facing surface of said piston element also having a third set of radial grooves in it staggered angularly with respect to said second set and extending radially inwardly from its outer edge towards, but short of, its inner edge for such distance that they overlap said first set of grooves during relative rotation of said piston element and said flange, a peg mounted on said piston element and slidably received in said socket, a boss on said piston element having an axial bore therein, a restrictor orifice communicating between said axial bore in said boss and said open ended bore provided by said cup, a hollow spigot slidably received in said axial bore in said boss and extending into said cylinder on the side of said piston element remote from said axially facing surfaces, the interior of spigot opening into the axial bore in said boss, and said spigot having a circumferentially extending recess in said cylinder, a hollow axially extending cylinder projecting on the end wall of said cylinder surrounding said spigot and having a circumferentially extending recess in its inwardly facing surface, a circlip having its outer edge received in said circumferentially extending recess in said projection, a split ring having its inner edge received in said circumferentially extending recess in said spigot and having its outer edge sandwiched between the inner edge of said circlip and the end wall of said cylinder, an axially extending recess in the outer surface of said spigot adjacent said piston element and leading from within said cylinder on the side of said piston element remote from said axially facing surfaces, a low pressure sump bounded in part by the outer edge of said piston element and the outer edge of said flange, a duct in said piston element extending between said sump and said axially extending recess in said spigot and said sump, a port in said spigot leading from said cylinder to the interior of said spigot, and means to supply liquid under pressure to said cylinder on the side of said piston remote from said axially facing surfaces.

ARTHUR ALEXANDER RUBBRA.
LIONEL HAWORTH.

References Cited in the file of this patent
UNITED STATES PATENTS

| Number | Name | Date |
|---|---|---|
| 1,272,041 | Herr | July 9, 1918 |
| 2,225,863 | Halford et al. | Dec. 24, 1940 |